July 16, 1968   D. A. COUNCIL ET AL   3,392,540
ICEMAKING MACHINE

Filed March 17, 1967   2 Sheets-Sheet 1

INVENTORS
DANSBY ANDERSON COUNCIL
ROBERT J. HENDERSON

BY Albert K. Kirchner
ATTORNEY

INVENTORS
DANSBY ANDERSON COUNCIL
ROBERT J. HENDERSON
BY *Albert H. Kirchner*
ATTORNEY

United States Patent Office 3,392,540
Patented July 16, 1968

3,392,540
ICEMAKING MACHINE
Dansby Anderson Council, Fort Smith, Ark., and Robert Jessie Henderson, Austin, Tex., assignors to Council Manufacturing Corporation, Fort Smith, Ark., a corporation of Arkansas
Filed Mar. 17, 1967, Ser. No. 623,955
5 Claims. (Cl. 62—138)

ABSTRACT OF THE DISCLOSURE

A machine for making ice pellets has a single speed constantly operating centrifugal water pump circulating its total discharge to the refrigerant-jacketed inner tube of an evaporator, without the usual water by-pass. The pump has a rate of flow exceeding that which can be properly frozen in the tube. A flow control valve between the pump and the tube imposes an upper limit on the rate of flow of the water at the discharge end of the pump; a pressure sensitive switch between the pump and the tube stops the flow of refrigerant to the jacket and substitutes hot gas for thawing when the ice formed in the tube is to be harvested; and a safety switch at the discharge end of the pump terminates the refrigerating operation upon failure of the pump or undue reduction of the discharged water pressure.

---

This invention relates to an ice-making machine and system and more particularly to a machine and system for automatically and cyclically producing batches of ice pellets.

There is a widespread need and demand in many types of commercial establishments, such as hotels, motels, restaurants, dairies, fish markets and poultry processing plants, for machines capable of producing ice pellets in high volume and with reliability and economy. The ice-making machine and system of the present invention are adapted to satisfy these requirements.

The machine provided by the invention is of the type in which a helical rod of ice is formed in the inner tube of a helical tube-in-tube evaporator through which water flows during the freezing portion of the cycle while refrigerant is evaporated in the outer tube, the helical rod of ice being hydraulically ejected from the inner tube during the harvesting portion of the cycle and being broken up into short cylindrical sections or pellets automatically on discharge from the evaporator.

While machines of this general type are known in the prior art, as exemplified, for example, by United States Patent 2,821,070 to Watt et al., all the machines of which we are aware have various deficiencies which it is an object of this invention to overcome and obviate. Thus, for example, one disadvantage of ice pellet machines of the prior art, such as that shown by the Watt et al. patent, is that they are uneconomical in the use of water and waste a considerable quantity of water which is not converted into ice.

Still another disadvantage of the prior art apparatus as exemplified by the machine of the Watt et al. patent is that the system is entirely dependent upon the pressure of the incoming water supply system for the ejection of the ice during the harvesting portion of the cycle and would be incapable of ejecting ice if the pressure of the water supply should drop below a predetermined value.

Another disadvantage of prior art ice-making machines is that they frequently employ control systems which depend upon critical settings or adjustments of the control devices, with the result that an improper setting or slight malfunction of any of the control devices may cause faulty and erratic operation of the whole system.

Accordingly, it is an object of this invention to provide a reliable and economical automatic ice-making machine of the type which produces ice pellets from a tube-in-tube evaporator.

Another object of the invention is to provide an ice-making machine which is economical in its use of water and which includes a closed water circulating system in which all of the water flowing through the system is ultimately converted into ice.

A further object of the invention is to provide an automatic ice-making machine of the tube-in-tube evaporator type in which the apparatus is not dependent for ejection of the ice pellets during the harvesting portion of the cycle upon the pressure of the incoming water supply system, which is a condition external of the ice-making machine and system and thus not subject to control, but which instead includes centrifugal pump means for hydraulically ejecting the ice from the freezing tube during the harvesting portion of the cycle.

Still a further object of the invention is to provide an automatic ice-making machine in which a single speed centrifugal pump is used to pump water through the freezing tube of the tube-in-tube evaporator and also to hydraulically eject the ice from the freezing tube during the harvesting portion of the cycle.

Still a further object of the invention is to provide an automatic ice-making machine having a safety control which insures proper and safe operation of the machine.

Generally speaking, in achievement of these objectives, there is provided in accordance with this invention an ice-making machine and system of the tube-in-tube evaporator type including an inner tube through which water to be frozen is circulated, and an outer tube which constitutes the evaporator of a refrigeration circuit and in which refrigerant is evaporated in heat exchange relation with the inner tube to cool the water in the inner tube. Water is continuously circulated through the inner tube by a centrifugal water pump to form a deposit of ice in the inner tube. The centrifugal pump includes an impeller which is so constructed as to provide a steep head-versus-flow curve, whereby head increases rapidly as flow is reduced. A flow control valve is installed between the discharge side of the centrifugal water pump and the inlet of the evaporator to control the flow of water through the freezing tube of the evaporator, the flow control valve acting as a restrictor to limit the water delivery rate from the pump through the flow control valve. A pressure sensing control on the discharge side of the flow control valve initiates the ice harvesting portion of the cycle when the water pressure has increased to a predetermined pressure, the pressure sensing control opening a valve in a hot refrigerant gas by-pass line from the output of the compressor to introduce hot gas into the outer tube of the tube-in-tube evaporator. The hot gas thaws the ice sufficiently to loosen its adhesion to the tube and to permit the ice to be hydraulically ejected from the tube and to be broken into short cylindrical pellets as it emerges from the outlet end of the freezing tube. As a safety feature, a second water pressure sensing control is installed in the water line between the pump discharge and the flow control valve. This second pressure sensitive control also functions to open the valve in the hot refrigerant gas by-pass line to introduce hot gas into the outer tube of the tube-in-tube evaporator should the water pump for any reason fail to operate or fail to build up sufficient pressure.

Further objects and advantages of the invention will become apparent from the following description taken in conjunction with the accompanying drawings in which.

Figure 1:
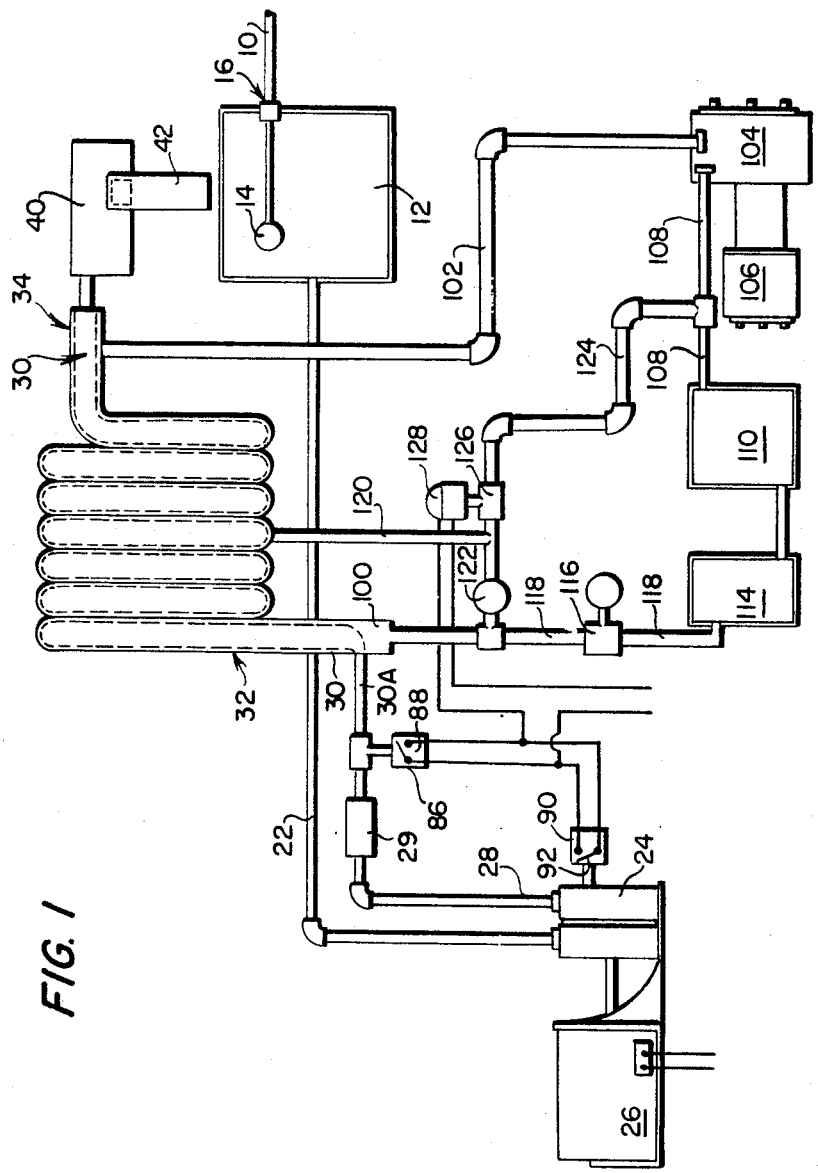
FIG. 1 is a schematic view, not to scale, and with various parts shown relatively displaced for clarity, of an ice-making machine and system embodying the invention.
Figure 2:
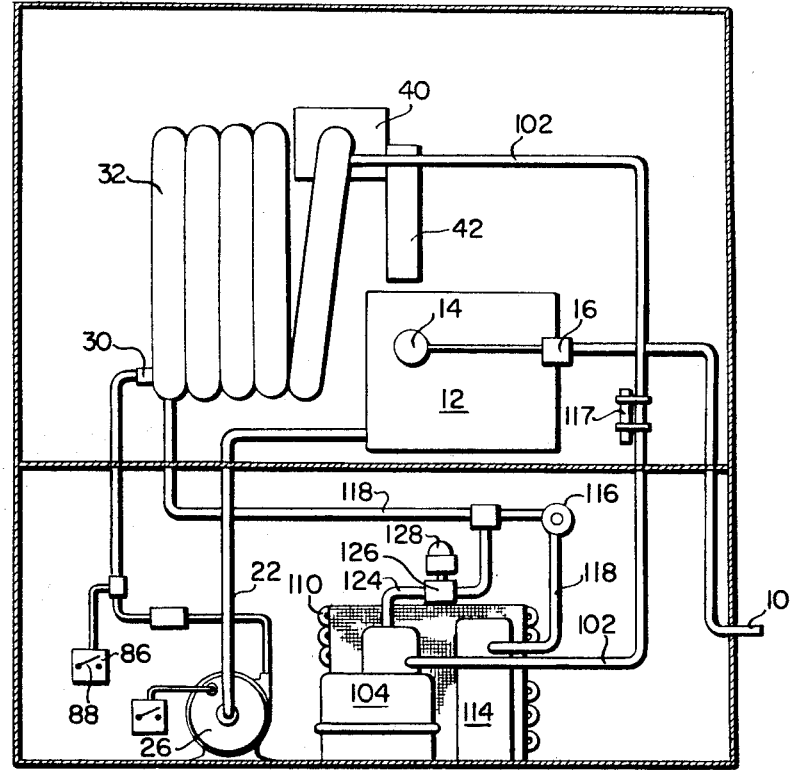
FIG. 2 is an elevational view of an ice-making machine in accordance with the invention with the proximate end wall of the casing removed.

Referring now to the drawings, and more particularly to FIGS. 1 and 2, the ice-making machine and system of the invention are supplied with water from a water supply pipe 10 which is connected to any suitable source of water supply through an appropriate manual cut-off valve (not shown), and which discharges into a reservoir or sump 12 through a valve 16 controlled by a float 14 which maintains the water at a constant level in sump 12.

A suction line 22 conducts the water from sump 12 to the inlet port of a single speed centrifugal water pump 24 driven by an electric motor 26. The centrifugal pump 24 is characterized by a steep head-versus-flow curve which builds head rapidly and substantially as the flow is reduced but does not allow the gallons per minute flow to go beyond a maximum horsepower requirement when the head is reduced.

It is well known that a centrifugal pump is a machine consisting of a set of rotating vanes enclosed within a housing or casing. The vanes, when rotated, impart energy to a fluid through centrifugal force. A centrifugal pump is characterized by an internal by-pass which allows the flow of water to be controlled by the head which it is working against. The design of the impeller of a centrifugal pump has a great influence on the relationship between head and flow. The diameter of the impeller controls the maximum head that a given impeller will develop, whereas the total vaning area controls the amount of flow. Therefore, an impeller of a given diameter having narrow vanes will have a very steep head-versus-flow curve; whereas, an impeller of an identical diameter having a greater vane surface will have a very flat head-versus-flow curve. As previously mentioned, the centrifugal pump 24 in the system of the present invention is characterized by an impeller having a steep head-versus-flow curve or characteristic in accordance with which pressure head builds rapidly and substantially as the flow is reduced, and flow increases when head is reduced. Pump 24 discharges the water through an outlet or discharge pipe 28 to the inlet end of a flow control or restrictor valve generally indicated at 29. The flow control or restrictor valve 29 may be of the type shown and described in U.S. Patent 2,389,134, issued to C. A. Brown on Nov. 29, 1945, and U.S. Patent 2,454,929, issued to L. A. Kempton on Nov. 30, 1948. The ice-making machine and system herein described require a rate of flow sufficient to maintain substantially the entire volume of liquid water in the tube in circulation during the ice-freezing operation. The pump 24 has a flow rate in excess of the requirements, and therefore the control valve 29 acts as a restrictor to limit the rate of flow in the water line between the discharge side of the pump 24 and the flow control valve 29. The discharge end of flow restrictor 29 is connected to the inner or water tube 30 of a tube-in-tube evaporator unit generally indicated at 32. The tube-in-tube evaporator unit 32 also includes an outer tube 100 connected in a refrigeration circuit to be hereinafter described. The concentric inner and outer tubes of evaporator unit 32 are wound in a plurality of helical turns of uniform radius of curvature and of constant cross section. At the terminal end of the evaporator unit 32, the inner or water tube 30 terminates in a short straight end portion 34 which extends substantially tangentially to the curvature of the preceding portion of the helical tubing. The abrupt change in the curvature at the outlet end of inner tube 30 causes the helical rod of ice formed during the freezing process (hereinafter explained) to be broken into short substantially cylindrical lengths or pellets which are discharged from the terminal end portion 34 of water tube 30 into a guideway located in a drain pan or ice bin 40 disposed at the outlet end of water tube 30. The guideway is formed of a plurality of laterally spaced parallel rails through which water may drain to tank or sump 12.

Positioned immediately laterally adjacent drain pan 40 and in fluid communication therewith through an opening 41 in the lower portion of the wall of drain pan 40 is a vertical drain duct 42 through which any water passing from water tube 30 into drain pan 40 returns to the sump 12, from which it is again returned by suction line 22 to pump 24 for recirculation. A pressure sensing switch 86 is connected to the water line 30A between the outlet end of flow restrictor 29 and the inlet to water tube 30 of the tube-in-tube evaporator. As best seen in the circuit diagram of FIG. 3, the pressure operated switch 88 controls a switch contact 86 connected in series with the hot gas solenoid 128 by means of conductors 234 and 236 connected across power lines 202 and 204. As ice begins to form in the water tube 30, it forms a restriction to the flow of the water passing through the flow control valve 29. Pressures will develop in the line 30A between the flow control valve 29 and the ice-making inner tube 30. As ice continues to form in tube 30, pressure sensing switch 86 senses the water pressure build-up in tube 30A which indicates the degree of ice formation in tube 30. When a predetermined pressure is reached in water line 30A due to ice build-up in water tube 30, pressure operated switch 86 is closed to close contact 88, to thereby energize hot gas solenoid 128. This causes hot gas to flow through the outer tube of the tube-in-tube evaporator to thaw the ice in tube 30 and thus permit hydraulic ejection of the ice in tube 30.

A safety switch 90 senses the water pressure between the discharge end of pump 24 and the restrictor or flow control valve 29. Switch 90 includes a contact 92 which is operated to closed position if the pump 24 should fail to operate for any reason or should fail to build up sufficient pressures for the proper operation of the ice-making machine. As seen in the wiring diagram of FIG. 3, contact 92 of switch 90 is electrically connected in parallel with contact 88 of pressure sensing switch 86, and in series with hot gas solenoid 128. Therefore, closure of switch 92 due to failure of water pump 24, or due to insufficient pressure in the discharge line of pump 24, will cause energization of hot gas solenoid 128, with the consequent opening of valve 126 in hot gas by-pass line 124, resulting in introduction of hot gas into the outer tube of the tube-in-tube evaporator. Safety switch 90 thereby prevents a continuation of the freezing operation if the water pump 24 is not operating properly or is failing to build up sufficient water pressure.

The refrigeration system includes a compressor 104 driven by a motor 106. Compressor 104 has a suction conduit 102 connected thereto through which the refrigerant gases are admitted for compression.

A discharge conduit 108 conducts hot compressed gases from compressor 104 to a condenser 110 which cools the compressed gases to liquid form, the condensed refrigerant being conducted by conduit 112 to a refrigerant receiver 114. The refrigerant passes from receiver 114 through outlet conduit 118 in series with expansion valve 116 to the inlet end of outer tube 100 of the tube-in-tube evaporator 32. The opening of expansion valve 116 is controlled by a thermal sensitive element 117 (FIG. 3) in thermal contact with the return or suction line 102 of compressor 104, as is well known in the refrigeration art. After passing through expansion valve 116, the refrigerant passes through conduit 118 and through the outer tube 100 of the tube-in-tube evaporator 32, and returns to the intake side of compressor 104 through refrigerant suction line 102.

In order to permit thawing of the ice in inner tube 30 sufficiently to free the ice from the inner surface of the wall of tube 30 when the ice is to be harvested, a hot gas conduit 124 is tapped into compressor discharge conduit 108 anterior the condenser 110 and connects into refrigerant conduit 118 posterior the expansion valve 116. A "hot gas" valve member 126 controlled by a solenoid 128 is interposed in series with hot gas line 124 and normally closes that line. A check valve 122 is connected in series with hot gas conduit 124 adjacent the connection of conduit 124 to conduit 118, in order to prevent reverse flow of refrigerant through the hot gas line.

To accelerate the defrosting action, hot gas is introduced not only into the inlet end of outer tube 100 through conduit 118, but also through a branch conduit 120 which is tapped into hot gas line 124 posterior valve 126 and anterior check valve 122.

Description of electrical circuitry

The following is a description of the electrical circuitry of the illustrated preferred embodiment of the icemaking machine and system.

Figure 3:
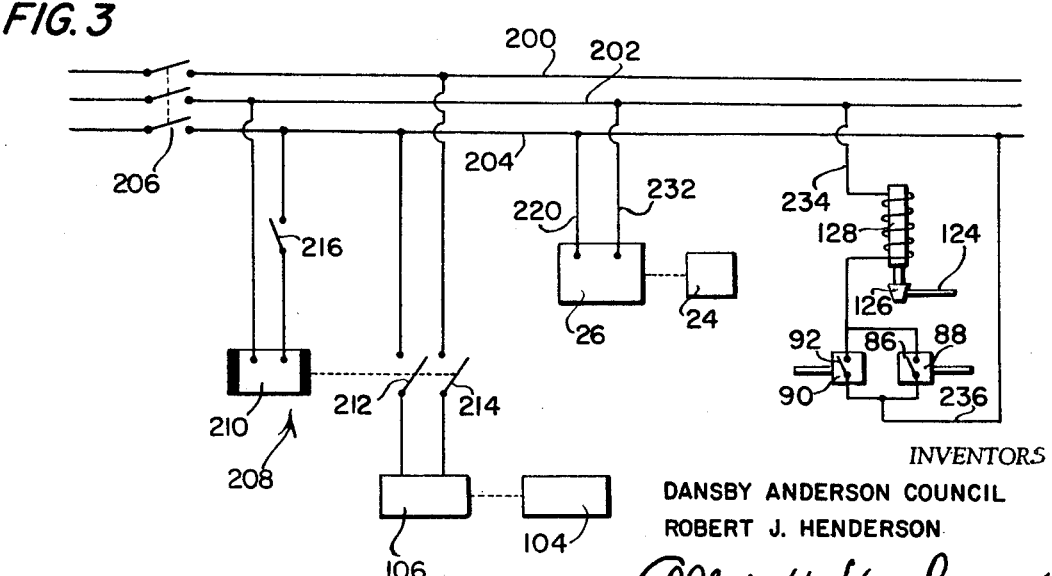
FIG. 3 is a schematic diagram of the electrical circuit connections of the ice-making machine and system.

Referring to the schematic diagram of FIG. 3, electrical power is supplied to the icemaking machine from a 220-volt, single-phase A.C. source over power lines 200, 202 and 204, through a main disconnect switch 206. Power line 202 is the neutral line, with a voltage of 110 volts existing between line 202 and each of the power lines 200 and 204.

The circuit of compressor motor 106 is controlled by a relay generally indicated at 208, including a relay operating coil 210 and two normally open contacts 212 and 214 which are operated to closed position when relay operating coil 210 is energized. Relay operating coil 210 is connected across power lines 202 and 204 in series with manually operated switch 216.

The electrical circuit of compressor motor 106 is energized by manually closing switch 216, assuming that main disconnect switch 206 is closed. With switch 206 closed, closure of manual switch 216 energizes relay operating coil 210. Compressor motor 106 is connected to electric power through relay contacts 212 and 214. With relay coil 210 energized by closure of manual switch 216, relay contacts 212 and 214 are actuated to closed position and compressor motor 106 is connected across power lines 200 and 204 through relay contacts 212, 214 to energize compressor motor 106.

The alternating current motor 26 which drives water pump 24 is connected by conductors 220 and 232 to power lines 204 and 202, respectively.

Hot gas solenoid 128 is connected by conductor 234 to neutral power line 202, the opposite end of solenoid 128 being connected to the parallel-connected fixed terminals of pressure switch 86 and of safety switch 90. The movable contacts 88 and 92 of the respective switches 86 and 90 are connected in parallel with each other and are connected by conductor 236 to power line 204. Each of the switches 86 and 90 is a single pole, single throw switch, the closure of either of which will complete the connection of hot gas solenoid 128 to power line 204 through conductor 236, to energize hot gas solenoid 128.

Suitable control means, not shown, may be provided to automatically interrupt the electrical power supply to the apparatus when the level of ice in the ice bin 40 reaches a predetermined level.

Description of operation

The following is a summary of the operation of the ice making machine and system hereinabove described:

To initiate the operation, a manual valve in water inlet line 10 is opened to permit water to pass through water supply pipe 10 to water supply tank or sump 12. As water is drained from tank 12 during the ice making cycle, float 14 controls valve 16 to replenish the water supply.

Main power switch 206 (FIG. 3) is then closed to connect single phase 220-volt A.C. electric power to power lines 200, 202 and 204. Upon the closure of main power switch 206, water pump motor 26 is energized to drive water pump 24 to circulate water to be frozen through water tube 30 of evaporator 32. Water thus begins to circulate through water tube 30 of the evaporator 32 as soon as main power switch 206 is closed.

To initiate operation of the compressor 104, manual switch 216 in the circuit of control relay 208 for the compressor motor 106 is then manually closed. Operating coil 210 of relay 208 is thereby energized to close normally open contacts 212 and 214 in the circuit of compressor motor 106. With relay contacts 212 and 214 closed by the energization of operating coil 210 of relay 208, compressor motor 106 is connected across power lines 200 and 204 to energize compressor motor 106.

As the ice making cycle proceeds, water pump 24 continues to pump water to be frozen through the flow restrictor 29, water thence passing into the inlet end of water tube 30 and emerging at the outlet end thereof. The water then passes into drain pan 40 and thence through drain duct 42 to sump tank 12, from whence it is returned by conduit 22 to the intake of water pump 24 for recirculation. The pump 24, as previously mentioned, is a centrifugal pump having an impeller which provides a steep head-versus-flow curve, characterized by a rapid and substantial increase in pressure with decrease in water flow and a rate of flow in excess of the rate at which water can be properly frozen into solid ice (as distinguished from ice slush) in the tube 30. The flow control valve or restrictor 29 is operative at the beginning of the cycle to keep the flow rate from the pump down to a proper limit. As ice builds up in the tube the back pressure in the line 30A increases, and the flow through the line 30A and the valve 29 continues freely at a decreasing rate.

In the refrigeration circuit, compressor 104 is driven by compressor motor 106 and draws the refrigerant gas through suction line 102 into the compressor where it is compressed, the hot compressed gas then passing by outlet conduit 108 of the compressor to condenser 110, from whence it passes by conduit 112 to refrigerant receiver 114. The refrigerant then passes through expansion valve 116 in response to regulation by a thermal sensing means 117 positioned in thermal contact with the suction line 102, in accordance with the conventional practice in refrigeration circuits. After passing expansion valve 116, the refrigerant passes through the portion of conduit 118 posterior to expansion valve 116 to the inlet end of outer or refrigerant tube 100 of the tube-in-tube evaporator 32. The refrigerant passing through tube 100 extracts heat from the water in inner water tube 30, cooling the water in tube 30. The spent refrigerant gas then returns to compressor 104 through suction line 102 where it is again compressed.

As ice begins to form on the interior surface of water tube 30, the flow of water through tube 30 gradually diminishes and the water pressure or head in the line 30A between flow restrictor 29 and the inlet end of water tube 30 increases sharply due to the steep head-versus-flow characteristic of the centrifugal pump. When the water pressure between flow restrictor 29 and the inlet end of the ice making tube 30 reaches a predetermined value, such as 28 lbs. per square inch, for example, pressure switch 86 is activated and closes the contact 88 to energize hot gas solenoid 128. Energization of solenoid 128 causes valve 126 in hot gas line to open, causing hot gas to pass directly from the discharge conduit 108 of compressor 104 through hot gas line 124, thence through conduit 118 posterior of expansion valve 116 to the inlet end of outer tube 100 of tube-in-tube evaporator 32. Hot gas also passes through by-pass line 120 to an intermediate point of evaporator tube 100. The hot gas passing through the evaporator tube 100 starts to thaw the outer periphery of the ice in water tube 30 so that the ice is soon loosened from its adhesion to the inner surface of water tube 30, preparatory to ejection of ice from the tube. The hot gas after passing through evaporator tube 100 returns through refrigeration suction line 102 to the intake of compressor 104. Once the ice begins to move in the water tube due to the thawing action of the hot gas, the water pressure in the line 30A leading to the inlet end of water tube 30 decreases and the flow of water increases to complete the hydraulic ejection of the ice from the water tube. The ice moves through tube 30 and emerges from the terminal portion 34 at the outlet end of tube 30, where the sudden change in curvature of tube 30 causes the helical rod of brittle ice, which is actually a thick-walled tube having a very small axial bore, to be broken into short lengths or pellets which pass outwardly onto a guideway in drain pan or ice bin 40. The decrease in water pressure which occurs once the ice has moved in the tube causes deactivation of water pressure switch 86 with consequent de-energization of hot gas solenoid 128, resulting in closure of valve 126 in hot gas line 124.

After the rod of ice has been completely ejected from water tube 30, the machine is ready for another cycle of operation in which another rod of ice will be formed and harvested. Conditions are restored to those required for the initiation of the freezing cycle, with water being passed into the inlet end of water tube 30 by pump 24 and with compressor 104 sending refrigerant through the normal refrigeration circuit to again cause freezing of the water in tube 30.

It is believed to be clear from the foregoing that there is provided in accordance with this invention an icemaking machine and system which constitute an improvement in a number of respects over prior art apparatus and systems of this general type. The apparatus of the invention has the advantage that it is economical in its use of water and ultimately converts all of the water flowing through the system into ice without exhausting any of the water into a waste drain as in some of the prior art icemaking apparatus and systems.

Furthermore, the apparatus of the present invention provides positive means for hydraulically ejecting the ice during the harvesting portion of the cycle which is not dependent upon the pressure of the external water supply system and permits the use of the same water circulating means for circulating water during the freezing operation and for hydraulically ejecting the ice during the harvesting operation.

The use of a centrifugal pump for pumping the water through the freezing tube has the advantage that the centrifugal pump is characterized by an internal by-pass which allows the flow of water to be controlled by the head which it is working against. This feature of the water pump operation cooperates with the reduced water flow requirement as ice begins to build up in the freezing tube, without the necessity for a water by-pass line as in our prior United States Patent 3,068,660. Furthermore, the use of a centrifugal pump having an impeller characterized by a steep head-versus-flow curve, with head increasing rapidly and substantially as flow is reduced, provides an ideal pressure signal for indicating when there has been sufficient build-up of ice in the freezing tube to require harvesting.

While there has been shown and described a preferred particular embodiment of the invention which has been found in actual commercial structures to give entirely satisfactory and reliable results, it will be obvious to those skilled in the art that various changes, modifications, additions and subtractions may be made therein without departing from the spirit of the invention as defined by the more broadly worded of the appended claims.

We claim:
1. An icemaking machine comprising
  a closed circuit water system, said system including
  a refrigerant-jacketed tube,
  a single speed constantly operating centrifugal pump for circulating water through said tube,
  and a single line connecting said pump to the tube for delivering to the tube at all times all the water discharged from the pump,
  said pump having a rate of flow exceeding the rate required to maintain substantially the entire volume of water in the tube in circulation during the ice forming operation,
  means for circulating a refrigerant through the jacket of the tube in heat exchange relation with water in the tube for forming a tubular deposit of ice on the inner wall of the tube,
  a flow restrictor interposed in said single line between the pump and the tube for limiting the flow rate of the water discharged from the pump,
  and a presure sensitive switch interposed between the flow control valve and the tube,
  said pressure sensitive switch being operable upon the pressure of the water at the inlet end of the tube rising to a predetermined value consequent upon increase of the ice deposit to initiate a thawing operation by supplying hot gas to the jacket so as to loosen said ice sufficiently to cause it to be discharged from the tube by continued pressure of water from the pump.

2. An icemaking machine as claimed in claim 1 including sensing means responsive to water pressure at the discharge end of the pump for terminating the refrigerating operation consequent upon reduction of said pressure below a predetermined value.

3. An icemaking machine as claimed in claim 1 including
  means for supplying alternatively refrigerant or hot gas to the tube jacket,
  and including valve means operable by said pressure sensitive switch from normally closed position supplying refrigerant to the jacket to open position supplying hot gas thereto.

4. An icemaking machine as claimed in claim 3 including also
  a safety switch comprising sensing means responsive to water pressure at the discharge end of the pump for actuating the valve means to open position responsive to reduction of said pressure below a predetermined value.

5. An icemaking machine as claimed in claim 4 in which
  said pressure sensitive switch and said safety switch are interposed in parallel in an electrical circuit operable upon closing of either of said switches to open said valve means for delivering said hot gas to the tube jacket,
  whereby the refrigerating operation is terminated alternatively by predetermined rise in water pressure at the inlet end of the tube or predetermined reduction of water pressure at the discharge end of the pump.

References Cited

UNITED STATES PATENTS

| | | | |
|---|---|---|---|
| 2,821,070 | 1/1958 | Watt et al. | 62—352 X |
| 3,068,660 | 12/1962 | Council et al. | 62—352 X |
| 3,164,968 | 1/1965 | Mullins | 62—352 X |
| 3,247,677 | 4/1966 | Bussell | 62—352 X |

OTHER REFERENCES

Mechanical Engineers' Handbook, Lionel S. Marks, Fourth Edition, 1941; McGraw-Hill Book Co.; pages 1893 and 1894.

ROBERT A. O'LEARY, *Primary Examiner.*

W. E. WAYNER, *Assistant Examiner.*